United States Patent
Lei et al.

(10) Patent No.: US 9,357,475 B2
(45) Date of Patent: May 31, 2016

(54) VEHICLE TELEMATICS SCAN RATE CONTROL

(71) Applicant: General Motors LLC, Detroit, MI (US)

(72) Inventors: Yao Hui Lei, Windsor (CA); Andrew J. Macdonald, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 162 days.

(21) Appl. No.: 14/169,938

(22) Filed: Jan. 31, 2014

(65) Prior Publication Data

US 2015/0223151 A1    Aug. 6, 2015

(51) Int. Cl.
| | |
|---|---|
| *H04W 4/00* | (2009.01) |
| *H04W 48/16* | (2009.01) |
| *H04W 76/04* | (2009.01) |
| *H04W 88/06* | (2009.01) |
| *H04W 72/00* | (2009.01) |
| *H04W 36/08* | (2009.01) |
| *H04W 48/10* | (2009.01) |
| *H04W 36/14* | (2009.01) |
| *H04W 8/24* | (2009.01) |
| *H04W 24/08* | (2009.01) |

(Continued)

(52) U.S. Cl.
CPC ............. *H04W 48/16* (2013.01); *H04W 8/24* (2013.01); *H04W 24/08* (2013.01); *H04W 36/08* (2013.01); *H04W 36/14* (2013.01); *H04W 48/10* (2013.01); *H04W 72/005* (2013.01); *H04W 76/048* (2013.01); *H04W 88/06* (2013.01); *H04B 17/309* (2015.01); *H04W 16/14* (2013.01); *H04W 36/0094* (2013.01); *H04W 48/18* (2013.01); *H04W 52/0209* (2013.01)

(58) Field of Classification Search
CPC . H04W 76/048; H04W 88/06; H04W 72/005; H04W 36/08; H04W 48/10; H04W 36/0094; H04W 36/14; H04W 48/18; H04W 52/0209; H04W 16/14; H04W 52/0225; H04W 60/00; H04W 72/082; H04W 52/02; H04W 52/0219; H04W 48/16; H04W 52/0232; H04B 17/30; Y02B 60/50
USPC ........ 455/434, 574, 422.1, 435.2, 432.1, 423, 455/425, 435.1, 458, 550.1, 552.1, 67.11, 455/436, 450, 569.2, 575.9; 370/311, 328, 370/329, 252, 312, 318, 331
See application file for complete search history.

(56) References Cited

U.S. PATENT DOCUMENTS

| | | | |
|---|---|---|---|
| 2007/0263558 A1* | 11/2007 | Salomone | H04W 52/0261 370/318 |
| 2008/0020748 A1* | 1/2008 | Parker | H04W 76/028 455/423 |
| 2011/0305177 A1* | 12/2011 | Woo | H04W 48/16 370/311 |

*Primary Examiner* — Fred Casca
(74) *Attorney, Agent, or Firm* — Christopher DeVries; Reising Ethington P.C.

(57) ABSTRACT

A method and a system of controlling a public land mobile network (PLMN) scan rate (PCR) in a vehicle telematics unit. The method carried out by the system includes the steps of: (a) determining a power condition that includes a powered mode, an unpowered mode, and a discontinuous reception (DRx) mode; (b) determining whether the telematics unit is scanning one or more home networks or one or more visitor networks; and (c) setting the PCR based on the determined power condition and the determined network, including: (c1) when in the powered mode and scanning a visitor network, the PCR is set to a first scan rate; (c2) when in the powered mode and scanning a home network, the PCR is set to a second scan rate that is slower than the first rate; and (c3) when in the DRx mode, the PCR is set to a third scan rate that is slower than the second rate.

16 Claims, 4 Drawing Sheets

(51) Int. Cl.
*H04W 36/00* (2009.01)
*H04W 52/02* (2009.01)
*H04W 16/14* (2009.01)
*H04B 17/309* (2015.01)
*H04W 48/18* (2009.01)

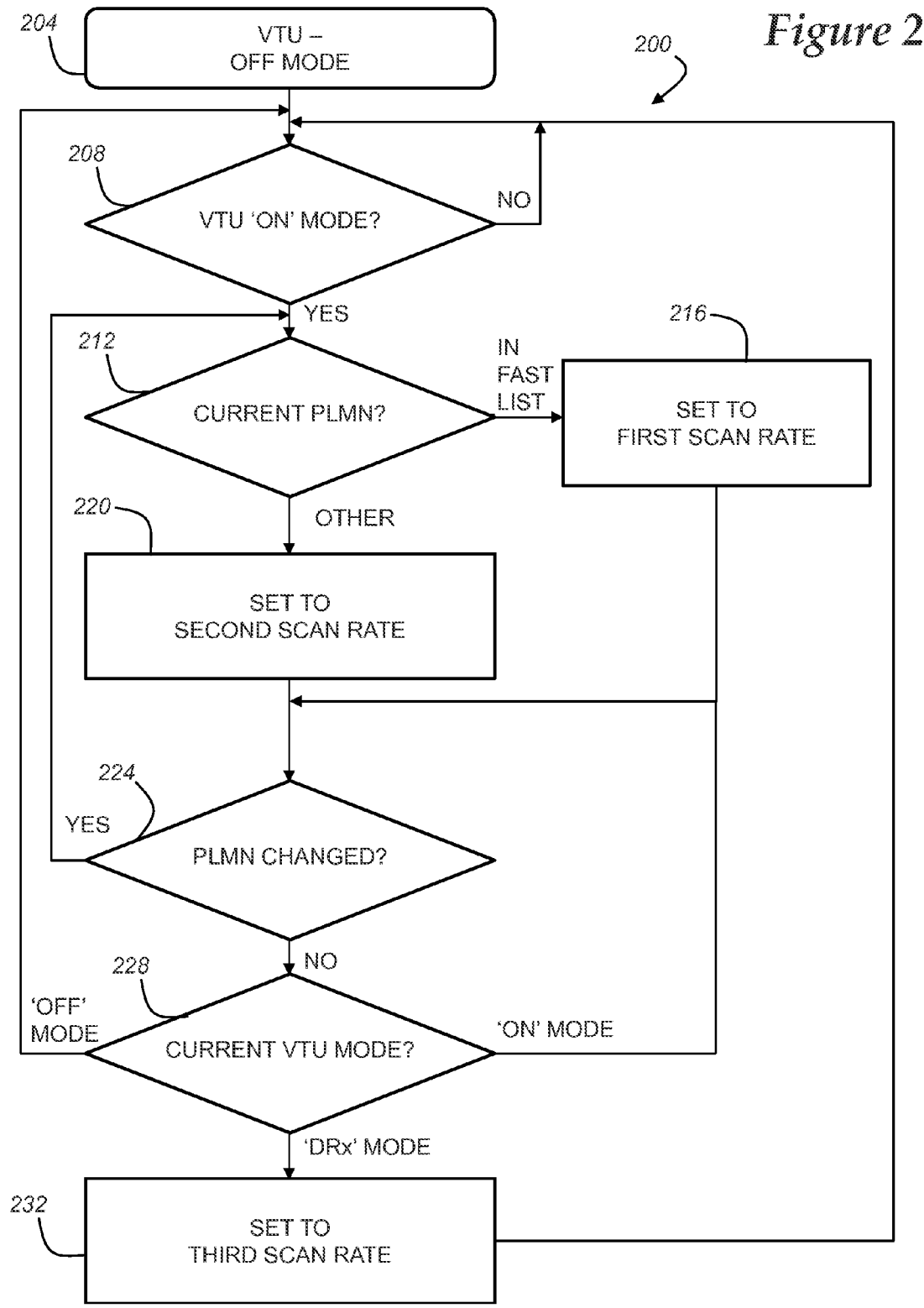

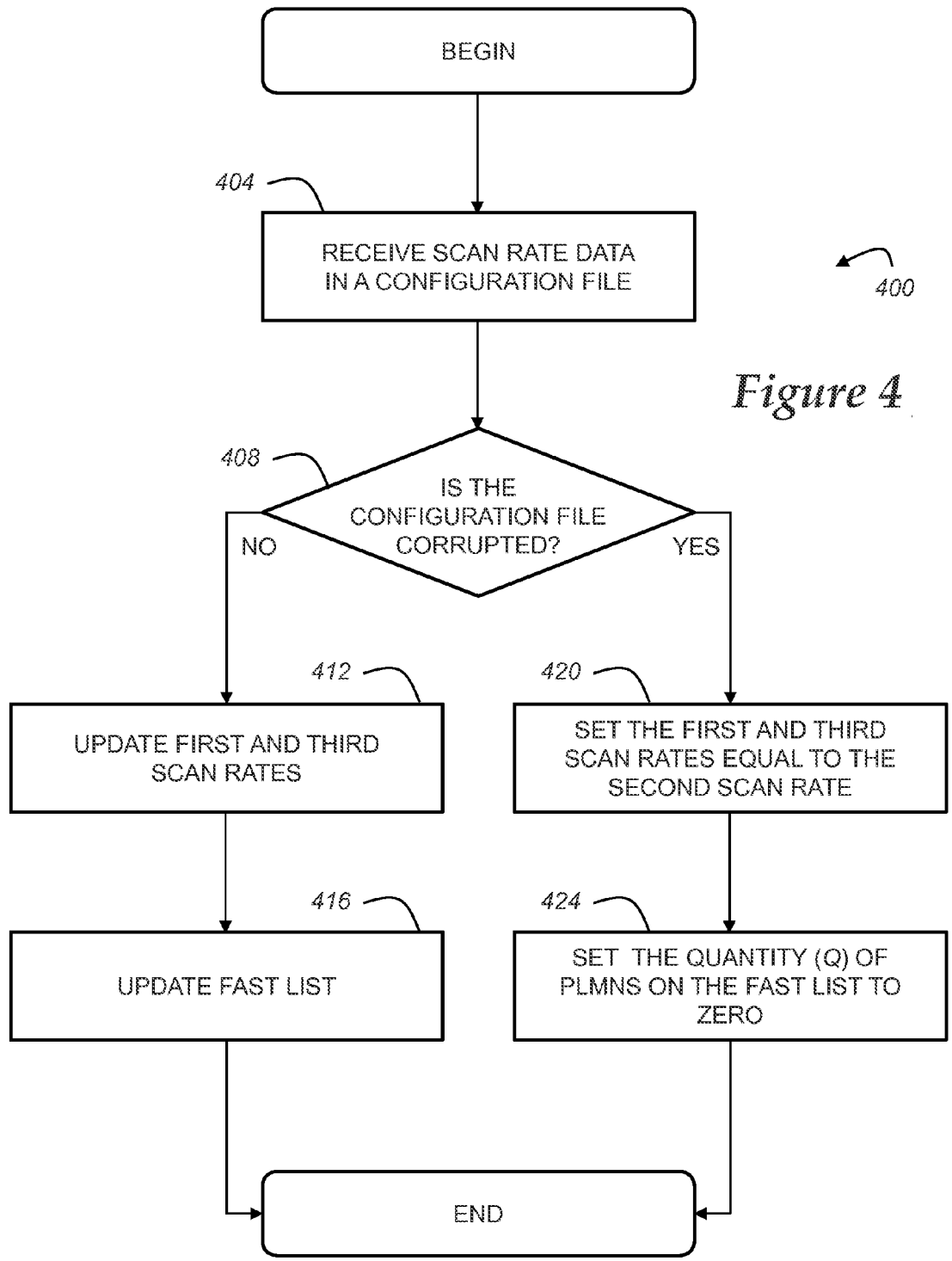

VEHICLE TELEMATICS SCAN RATE CONTROL

TECHNICAL FIELD

The present invention relates to controlling a PLMN scan rate of a vehicle telematics unit.

BACKGROUND

Mobile or cellular devices may change public land mobile networks (PLMNs) as the mobile device is relocated or as signal strength changes. For example, the mobile device may be moving between two geographic regions. Thus, in some instances, changing PLMNs may allow roaming—e.g., allowing cellular service out of the range of a home (or non-roaming) PLMN.

SUMMARY

According to an embodiment of the invention, there is provided a method of controlling a public land mobile network (PLMN) scan rate in a vehicle telematics unit. The method includes: (a) determining at the telematics unit a power condition that includes a powered mode, an unpowered mode, and a discontinuous reception (DRx) mode; (b) determining at the telematics unit whether the telematics unit is scanning one or more home networks or one or more visitor networks; and (c) setting the PLMN scan rate for the telematics unit based on the determined power condition and the determined network. Step (c) may include: (c1) when the telematics unit is in the powered mode and when the telematics unit is scanning a visitor network, the PLMN scan rate is set to a first scan rate; (c2) when the telematics unit is in the powered mode and when the telematics unit is scanning a home network, the PLMN scan rate is set to a second scan rate that is slower than the first rate; and (c3) when the telematics unit is in the DRx mode, the PLMN scan rate is set to a third scan rate that is slower than the second rate.

According to another embodiment of the invention, there is provided a method of controlling a public land mobile network (PLMN) scan rate in a vehicle telematics unit. The method includes: (a) determining a PLMN scanned by the telematics unit; and (b) setting a PLMN scan rate of the telematics unit. Step (b) may include: (b1) when the scanned PLMN is included in a predetermined PLMN list, the scan rate is set to a first scan rate; and (b2) when the PLMN is not included in the predetermined PLMN list, the scan rate is set to a second scan rate that is slower than the first scan rate. The method may further include: step (c) after setting the first scan rate or the second scan rate, determining whether the PLMN being scanned has changed. Step (c) may include: (c1) when the scanned PLMN has changed, repeating step (b) for the currently scanned PLMN; and (c2) when the scanned PLMN has not changed, determining whether the telematics unit is in a powered mode, an unpowered mode, or in a discontinuous reception (DRx) mode, wherein: (c2.1) when the telematics unit is in a powered mode, repeating step (c); (c2.2) when the telematics unit is in the unpowered mode, repeating steps (a), (b), and (c) when the telematics unit is powered again; and (c2.3) when the telematics unit is in the DRx mode, setting the scan rate to a third scan rate that is slower than the second scan rate.

According to another embodiment of the invention, there is provided a method of updating public land mobile network (PLMN) scan rate data for a vehicle telematics unit. The method includes: (a) receiving scan rate data at a vehicle telematics unit having a first scan rate and a second, slower scan rate, wherein the second scan rate is associated with a cellular chipset of the telematics unit, wherein the scan rate data comprises an updated first scan rate; (b) determining whether the scan rate data is corrupt; (c) when step (b) determines the scan rate data not to be corrupt, replacing the first scan rate with the updated first scan rate; and (d) when step (b) determines the scan rate data to be corrupt, setting the value of the first scan rate to the second scan rate.

BRIEF DESCRIPTION OF THE DRAWINGS

One or more embodiments of the invention will hereinafter be described in conjunction with the appended drawings, wherein like designations denote like elements, and wherein:

FIG. 2 is a flow diagram illustrating an implementation of controlling a public land mobile network (PLMN) scanning rate for a vehicle telematics unit;

FIG. 4 is a flow diagram illustrating an implementation for updating scan rate data at the telematics unit.

DETAILED DESCRIPTION OF THE ILLUSTRATED EMBODIMENT(S)

The method described below generally pertains to controlling scan rate in a vehicle telematics unit for a public land mobile network (PLMN). When the telematics unit is powered ON, it may enter a no call mode and scan for a PLMN. The description below describes changing the scan rate based on the PLMN used and a power condition of the telematics unit. For example, the scan rate may be a normal scan rate when the telematics unit scans a home PLMN (HPLMN) in a powered mode and a faster scan rate when the telematics unit scans a visitor PLMN (VPLMN) in the powered mode. Or for example, the scan rate may be slower when the telematics unit scans either the HPLMN or VPLMN in a discontinuous reception (DRx) mode (e.g., in LTE networks). Enabling the telematics unit to scan faster in VPLMNs may enable the telematics unit to reconnect or return to its HPLMN faster, thereby limiting the amount of any incurred roaming charges.

The system and the various methods carried out by the system are described below in greater detail. In addition, the operating environment is described below.

Communications System—

Figure 1:
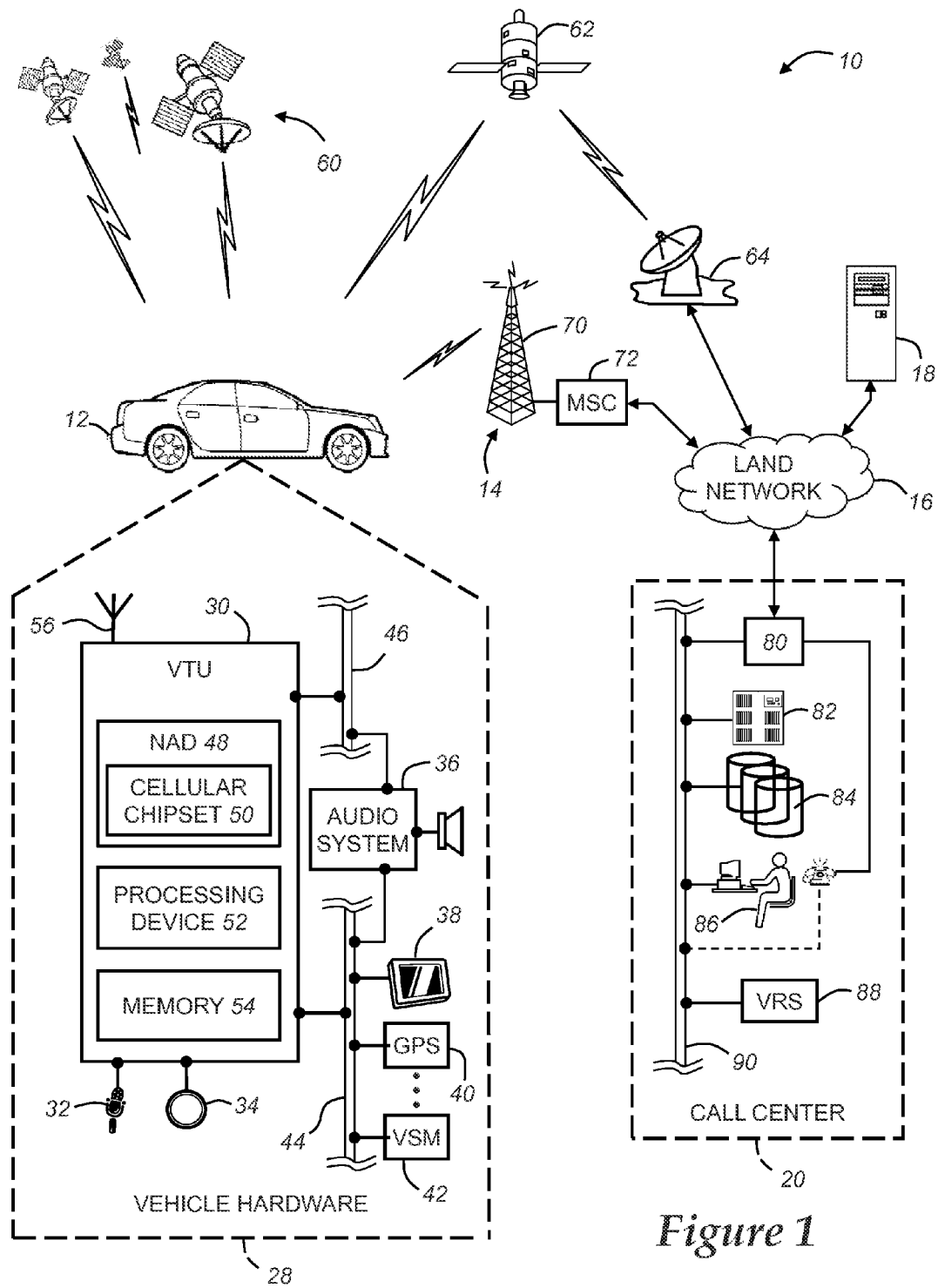
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA or LTE standards and thus includes a network access device (NAD) 48 which may include one or more standard cellular chipsets 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Prior to establishing a voice or data call, the vehicle telematics unit 30 may use the communication system 10 described above and scan for public land mobile networks (PLMNs); e.g., as previously described, both home PLMNs (HPLMNs) and visitor PLMNs (VPLMNs). Scanning for an available PLMN may be intermittent or continuous—e.g., as the telematics unit 30 attempts to both establish the most suitable PLMN for communication. Furthermore, the decision to scan (or not to scan) may be prescribed by any suitable standard (e.g., the 3GPP standard). Scanning for PLMNs may account for a substantial percentage of a telematics unit power budget. The methods described below may be used to minimize the power demand of the telematics unit, as well as minimize any resulting roaming charges or fees when scanning VPLMNs.

As shown in FIG. 2, a flow diagram illustrates one implementation of a method 200 for controlling a PLMN scan rate for the telematics unit 30. The method begins with step 204 where the vehicle telematics unit (VTU) is in an 'unpowered mode'—i.e., the VTU is without power or is in an OFF mode or state or condition.

From step 204 the method may proceed to step 208 where the VTU may determine the power mode of the VTU 30. More specifically, step 208 may determine whether the VTU is in a 'powered mode'—e.g., in full power mode or full ON mode (or ON state or condition). Changing from the unpowered mode to the powered mode may occur at the time of vehicle start-up or at various other suitable instances. For example, circumstances may exist when the vehicle is powered; however, the VTU 30 is in the unpowered mode and a vehicle user or the call center 20 may trigger the VTU to the powered mode. If in step 208 it is determined that the VTU is not in the powered mode, the method may proceed again to step 208. This loop may be performed repeatedly if the VTU is determined to not be in the powered mode.

If however in step 208 it is determined that the VTU is in the powered mode, the method 200 may proceed to step 212 where the VTU 30 may determine what specific PLMN currently is being scanned. In step 212, the currently scanned PLMN may be compared against a fast list or listing of predetermined PLMNs stored in the memory 54 of the VTU 30. The PLMNs provided in the fast list may be associated with a first or FAST PLMN scan rate (first PCR) of the VTU 30. For example, the fast list may comprise one or more VPLMNs or visitor networks. The VPLMNs on the fast list may be determined based on or associated with the vehicle's 12 location and a vehicle user's general driving habits (e.g., how far the user typically drives or other locations typically visited by the user). The quantity (Q) of PLMNs on the fast list may vary; however, in one implementation, $0 \leq Q \leq 20$. As described below, the fast list may be updated from time to time.

If in step 212 the currently scanned PLMN matches one of the PLMNs on the fast list, the method 200 may proceed to step 216; however, if the currently scanned PLMN does not match one of the PLMNs on the fast list, the method may proceed to step 220.

In step 216, the method may set the scan rate of the VTU 30 to the first PLMN scan rate and then proceed to step 224. The first scan rate may be received from memory 54 of the VTU 30.

In step 220, the method may set the scan rate of the VTU 30 to a second or NORMAL PLMN scan rate (second PCR). The second scan rate may be determined by the VTU 30 using the subscriber identity module (SIM) of the network access device (NAD) 48. For example, the cellular chipset 50 of the NAD may have a standard scan rate associated therewith, as will be appreciated by skilled artisans. In at least some embodiments, the second scan rate may be slower than the first scan rate. And the second scan rate may be the scan rate associated with the VTU's home network; e.g., a specific or primary home network associated with the particular VTU, as well as any equivalent home PLMNs (or EHPLMNs). From step 220, the method 200 also may proceed to step 224.

In step 224, the VTU 30 may determine whether the PLMN being scanned by the VTU has changed since the last determination in step 212. Thus, the method 200 may compare the PLMN from step 212 to the currently scanned PLMN. If the PLMN has changed, the method may proceed to step 212 and may repeat steps 212, 216 or 220, and 224. If the PLMN has not changed, the method may proceed to step 228.

In step 228, the method 200 again may determine power mode of the VTU 30. In step 228, the power mode may include both the powered mode and the unpowered mode. Further, in LTE systems, the power mode may include a discontinuous reception (DRx) mode. As will be appreciated by skilled artisans, once in the powered mode, the VTU 30 may enter an idle-like mode known as the DRx mode (e.g., when there is currently no network traffic). In some implementations of the DRx mode, the VTU 30 may be idle (or sleeping) for a period of time and then wake up briefly to check for network traffic and then go idle again if no traffic exists. Other DRx mode implementations may exist and are known to skilled artisans.

Thus, in step 228, the method 200 may determine whether the VTU 30 is in the powered mode, the unpowered mode, or the DRx mode. If the VTU 30 remains in the powered mode, the method 200 may proceed to step 224, repeating steps 224 and 228. If the VTU 30 has changed to the unpowered mode, the method 200 may proceed to step 208, repeating steps 208, 212, 216 or 220, 224, and 228. And if the VTU 30 has changed to the DRx mode, the method 200 may proceed to step 232.

In step 232, the method may set the scan rate of the VTU 30 to a third or DRx PLMN scan rate (third PCR). The third scan rate may be received from memory 54 of the VTU, and in at least some embodiments, the third scan rate may be slower than the second scan rate. After changing the scan rate to the third scan rate, the method may proceed to step 208, repeating steps 208, 212, 216 or 220, 224, and 228. Of course in step 212, if the VTU 30 remains in the DRx mode (which is not the 'powered mode'), the method 200 will repeatedly re-evaluate the power mode of the VTU (while remaining in the DRx mode)—not proceeding to step 212 until the VTU 30 is in the powered mode. Also, it will be appreciated that the VTU 30 may change from the DRx mode to the unpowered mode (and the method 200 may not proceed beyond step 208 until the VTU changes to the powered mode).

Figure 3A:
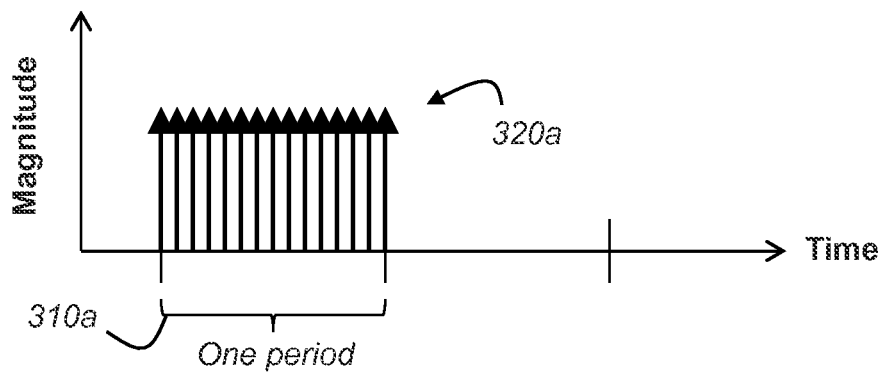
FIG. 3A is a graphical depiction of a first scan rate.
Figure 3B:
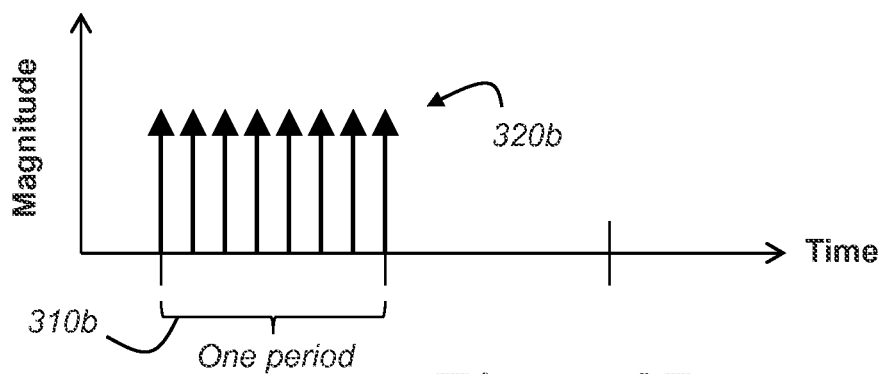
FIG. 3B is a graphical depiction of a second scan rate.
Figure 3C:
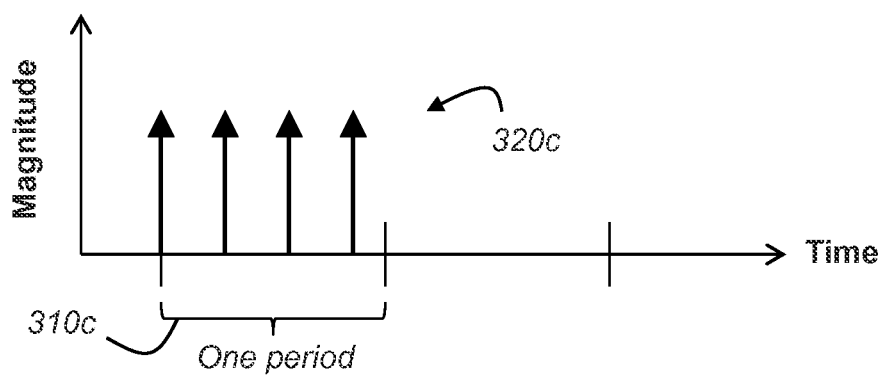
FIG. 3C is a graphical depiction of a third scan rate.

The method 200 may conserve power consumed by the telematics unit 30, as faster scanning rates typically consume more power than slower scanning rates. FIGS. 3A, 3B, and 3C illustrate three different graphical depictions in which the independent variable is time (x-axis) and the dependent variable is magnitude (y-axis). Each graph illustrates a single scanning period of the telematics unit 30 (e.g., 310a, 310b, 310c, respectively). In FIG. 3A, the first PLMN scan rate is illustrated as a plurality of pulses 320a. In FIG. 3B, the second PLMN scan rate is illustrated as a plurality of pulses 320b. In FIG. 3C, the third PLMN scan rate is illustrated as a plurality of pulses 320c. In addition, each of the pulses 320a, 320b, 320c are illustrated as having the same magnitude. In FIG. 3A, the quantity of pulses 320a is greater than the quantity of pulses 320b (FIG. 3B); and the quantity of pulses 320b (FIG. 3B) is greater than the quantity of pulses 320c (FIG. 3C)—illustrating: third scan rate (320c)<second scan rate (320b)<first scan rate (320a). Thus, in at least one implementation, the third scan rate may consume less power than the second scan rate; and the second and third scan rates may consume less power than the first scan rate. Moreover, while the first scan rate may consume more power, the first scan rate also may provide the greatest scanning performance (e.g., greatest responsiveness)—thus, while the telematics unit is in a VPLMN, it may scan the fastest seeking to return to its HPLMN or equivalent.

It should be appreciated that FIGS. 3A, 3B, and 3C are merely illustrative; the number of pulses used and the magnitudes thereof are simply used to illustrate relative power consumption of the telematics unit. Other implementations are possible.

Turning to FIG. 4, there is shown a flow diagram illustrating a method 400 for updating scan rate data or parameters in the telematics unit. As previously discussed, the first and third scan rates and the fast list may be stored in the memory 54 of the telematics unit 30. The method 400 begins at step 404 with new or updated scan rate data being received at the telematics unit 30 via a configuration file. The configuration file may be received from the call center 20, a remote computer or server 18, a vehicle service center, etc.—in addition, the configuration file may be received via wired or wireless communication (e.g., wireless communication may include cellular communication and short range wireless communication).

The scan rate data included in the configuration file may include an updated first scan rate (an updated value), an updated third scan rate (an updated value), and an updated fast list (e.g., 0-20 new predetermined PLMNs). In some instances, this data may be at least partially the same as that previously stored. In addition, the first and third scan rates may be multipliers—determinable using the second scan rate. For example, the configuration file may provide a first scan rate multiplier of 1.2 and a third scan rate multiplier of 0.8; thus, the new first scan rate may be 1.2*second scan rate (acquired from the SIM of the NAD 48), and the new third scan rate may be 0.8*second scan rate. These are merely a few examples; other implementations exist.

The method 400 may proceed from step 404 to step 408; and in step 408, the telematics unit may determine whether the configuration file is corrupted. Corrupted files may include those inoperable, unreadable, or unusable; those partially downloaded or received; those with values that are out of a predetermined or reasonable range; etc. Thus, for example, the telematics unit 30 may determine that no first scan rate may be greater than 10 times the second scan rate (or that no third scan rate may be less than 10 times the second scan rate). The factor of 10× is merely an example; other predetermined reasonable ranges are possible. In another example, the configuration file may be determined to be corrupted if more than 20 PLMNs are in the updated fast list.

In some instances, the configuration file may encrypted or otherwise secured. Thus, for example, if the configuration file is not authenticable during decryption (e.g., at the telematics unit 30), then the configuration file may be determined to be corrupt as well. Skilled artisans will appreciate other various means for determining whether the configuration file is corrupted.

If the configuration file is determined not to be corrupt, the method 400 may proceed to step 412—updating the first and third scan rates; i.e., replacing or overwriting in memory 54 the old first and third scan rates with the updated first and third scan rates.

After step 412, the method may update the fast list in step 416 by replacing or overwriting the old fast list with the updated fast list. Step 416 may occur before, after, or during step 412. Thereafter, the method 400 may end.

If the configuration file is determined to be corrupt, the configuration file may be ignored (e.g., ignoring the updated first and third scan rates and the updated fast list). For example, the method 400 may proceed to step 420—setting the first and third scan rates equal to the second scan rate (as opposed to overwriting with the updated first and third scan rates); i.e., replacing or overwriting in memory 54 each of the old first and third scan rates with the value of the second scan rate.

After step 420, the method (in step 424) may set the quantity (Q) of PLMNs in the fast list to zero (as opposed to using the updated fast list); i.e., by replacing or overwriting the old fast list with the updated fast list having zero PLMNs. Step 424 may occur before, after, or during step 420. Thereafter, the method 400 may end.

The method 400 may preserve the integrity of the PLMN scanning function in the telematics unit 30 from malicious attacks. Of course, the method 200 may operate with concurrently with method 400—thus in method 200, setting first and/or third scan rates in steps 216 and 232 may be performed in real time as updated first and/or third scan rates are received and validated via method 400. Likewise, any determining that the current PLMN is in the fast list (step 212 of method 200) may occur in real time while the updated fast list is validated via method 400.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a public land mobile network (PLMN) scan rate in a vehicle telematics device, comprising the steps of:
   (a) determining at the telematics device a power condition that includes a powered mode, an unpowered mode, and a discontinuous reception (DRx) mode;
   (b) determining at the telematics device whether the telematics device is scanning one or more home networks or one or more visitor networks; and
   (c) setting the PLMN scan rate for the telematics device based on the determined power condition and the determined network, wherein:
      (c1) when the telematics device is in the powered mode and when the telematics device is scanning a visitor network, the PLMN scan rate is set to a first scan rate;
      (c2) when the telematics device is in the powered mode and when the telematics device is scanning a home network, the PLMN scan rate is set to a second scan rate that is slower than the first rate; and
      (c3) when the telematics device is in the DRx mode, the PLMN scan rate is set to a third scan rate that is slower than the second rate.

2. The method of claim 1, wherein the second rate is a NORMAL scan rate associated with a subscriber identity module (SIM) of the telematics device.

3. The method of claim 1, wherein the one or more home networks includes at least one of a primary home network and an equivalent home network.

4. The method of claim 1, wherein a list of the one or more visitor networks is stored in the telematics device.

5. The method of claim 4, further comprising receiving at the telematics device an updated list of visitor networks to replace the previous list from one of a call center, remote computer, or service center.

6. The method of claim 5, wherein the updated list further comprises a value of the first scan rate and a value of the third scan rate.

7. The method of claim 6, wherein the value of the first scan rate or the value of the third scan rate is associated with a multiplier.

8. The method of claim 5, further comprising when the updated list received at the telematics device is corrupted, performing at the telematics device the following steps:
   ignoring the updated list;
   setting the first and third scan rates to be equal with the second scan rate; and removing any of the one or more visitor networks on the previous list.

9. The method of claim 4, wherein the list includes zero to twenty visitor networks.

10. The method of claim 1, further comprising repeating step (c) when the telematics device is determined to be scanning a different home or visitor network.

11. The method of claim 1, further comprising repeating steps (a), (b), and (c) after the telematics device exits the DRx mode or after the telematics device exits the unpowered mode.

12. A method of controlling a public land mobile network (PLMN) scan rate in a vehicle telematics device, comprising the steps of:
   (a) determining a PLMN scanned by the telematics device;
   (b) setting a PLMN scan rate of the telematics device, wherein:
      (b1) when the scanned PLMN is included in a predetermined PLMN list of visitor networks, the scan rate is set to a first scan rate; and
      (b2) when the PLMN is not included in the predetermined PLMN list, the scan rate is set to a second scan rate that is slower than the first scan rate;
   (c) after setting the first scan rate or the second scan rate, determining whether the PLMN being scanned has changed, wherein:
      (c1) when the scanned PLMN has changed, repeating step (b) for the currently scanned PLMN; and
      (c2) when the scanned PLMN has not changed, determining whether the telematics device is in a powered mode, an unpowered mode, or in a discontinuous reception (DRx) mode, wherein:
         (c2.1) when the telematics device is in a powered mode, repeating step (c);
         (c2.2) when the telematics device is in the unpowered mode, repeating steps (a), (b), and (c) when the telematics device is powered again; and
         (c2.3) when the telematics device is in the DRx mode, setting the scan rate to a third scan rate that is slower than the second scan rate.

13. The method of claim 12, wherein the second scan rate is a NORMAL scan rate associated with a subscriber identity module (SIM) of the telematics device.

14. The method of claim 12, wherein the predetermined PLMN list is stored in the telematics device and replaced with an updated PLMN list from time to time.

15. The method of claim 14, wherein the updated PLMN list includes zero or more new PLMNs, an updated value of the first scan rate, and an updated value of the third scan rate.

16. The method of claim 15, further comprising performing at the telematics device the following steps when the updated PLMN list is corrupted:
   ignoring the updated PLMN list;
   setting the first and third scan rates to be equal with the second scan rate; and removing any of the one or more PLMNs on the predetermined PLMN list.

* * * * *